Dec. 1, 1959 G. E. MEESE 2,915,033
SEALING MEANS FOR HATCH COVERS AND THE LIKE
Filed Aug. 27, 1958 4 Sheets-Sheet 1

INVENTOR.
GEORGE E. MEESE
BY Scrivener and Parker

Dec. 1, 1959  G. E. MEESE  2,915,033
SEALING MEANS FOR HATCH COVERS AND THE LIKE
Filed Aug. 27, 1958  4 Sheets-Sheet 2

INVENTOR.
GEORGE E. MEESE
BY Scrivener and Parker

INVENTOR.
GEORGE E. MEESE
BY Scrivener and Parker

INVENTOR.
GEORGE E. MEESE
BY Scrivener and Parker

United States Patent Office 2,915,033
Patented Dec. 1, 1959

2,915,033
SEALING MEANS FOR HATCH COVERS
AND THE LIKE

George E. Meese, Annapolis, Md.

Application August 27, 1958, Serial No. 757,467

8 Claims. (Cl. 114—202)

This invention relates to hatch covers and more particularly to improved means for sealing hatch covers so as to render them weather and water-tight when in closed position.

An object of the present invention is to provide a hatch cover seal which is particularly, though not exclusively, suited for use with hatch covers of the slideable type.

More particularly it is an object of the present invention to provide sealing means which is well adapted for use with relatively large hatch covers such as those used in connection with access openings leading into cargo holds in ships or barges; a particular feature of the invention residing in the elimination of the necessity of having to lift bodily a heavy hatch cover into sealing engagement with a fixed knife edge as is usually the case with hatch covers used heretofore.

It is still another object of the invention to provide for a slideable hatch cover sealing means which permits the ready movement of the hatch cover between opened and closed positions and also serves as a braking means for releasably retaining a hatch cover in any desired position within its range of movement.

Other objects and their attendant advantages will become apparent as the following detailed description is read in conjunction with the accompanying drawings wherein.

Figure 1:
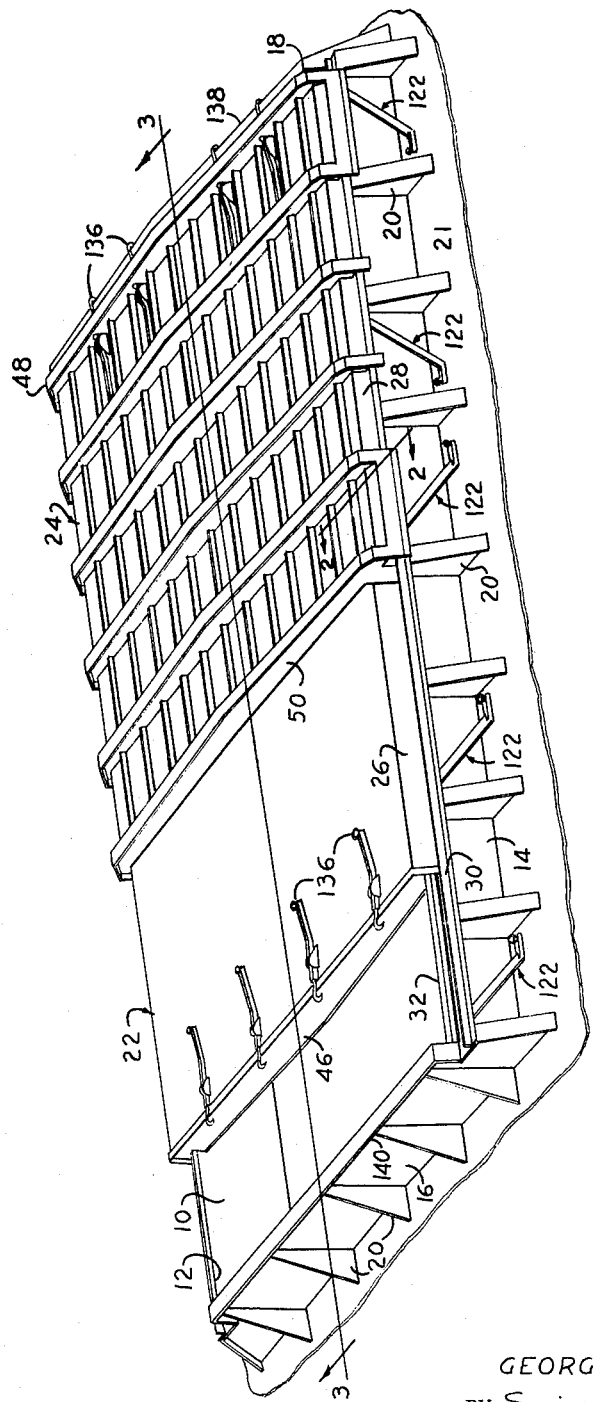
Fig. 1 is a perspective view of a hatch and hatch covers incorporating the present invention.
Figure 2:
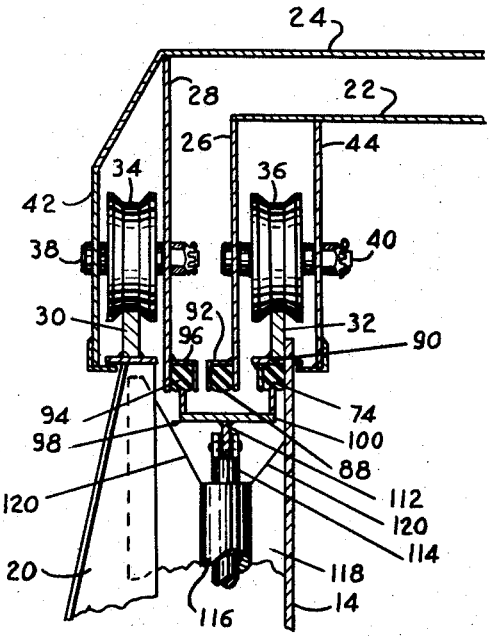
Fig. 2 is an enlarged vertical cross-sectional view taken substantially on line 2—2 of Fig. 1.

Referring to Fig. 1, a hatch way 10 is illustrated surrounded by vertical side walls 12, 14 and end walls 16, 18 which are supported by spaced brackets 20 connected between the side walls and a floor or deck 21. The walls 12, 14 and 16, 18 form a coaming for slideably supporting a pair of hatch covers 22, 24. The hatch covers are arranged so that the hatch cover 22 may be slid beneath the hatch cover 24, each of the covers having respectively downwardly extending side walls 26, 28 carrying suitable means engaging rails on top the coaming which enable the hatches to be moved on the coaming to any desired position. One such means for movably supporting the hatches is illustrated in Fig. 2, where it will be seen that the coaming wall 14 is provided with a pair of transversely spaced parallel rails 30, 32 engaged respectively by a plurality of rollers 34, 36 which are rotatably supported on suitable axles 38, 40 fixed between and through the hatch cover side walls 26, 28 and parallel wall members 42, 44 which are welded or otherwise secured to the sides of the hatch covers to form wheel boxes. The outer ends of the axles exposed to weather may be suitably sealed. The means for slideably supporting the hatch covers form no part of the invention and it will be apparent to those skilled in the art that a variety of means could be employed other than the rollers shown and described.

Means are provided for sealing the ends of the hatch covers when in closed position. The respective transverse ends 46, 48 of the covers 22, 24 are adapted to engage the coaming end walls 16, 18 to form a seal when the hatch covers are closed as will be presently described. In like manner, the opposite ends 50, 52 (see Fig. 3) of the respective hatch covers are adapted to sealingly engage each other to form a water-tight joint between the hatches when the ends 46, 48 are in sealing engagement with the coaming end walls.

Figure 3:
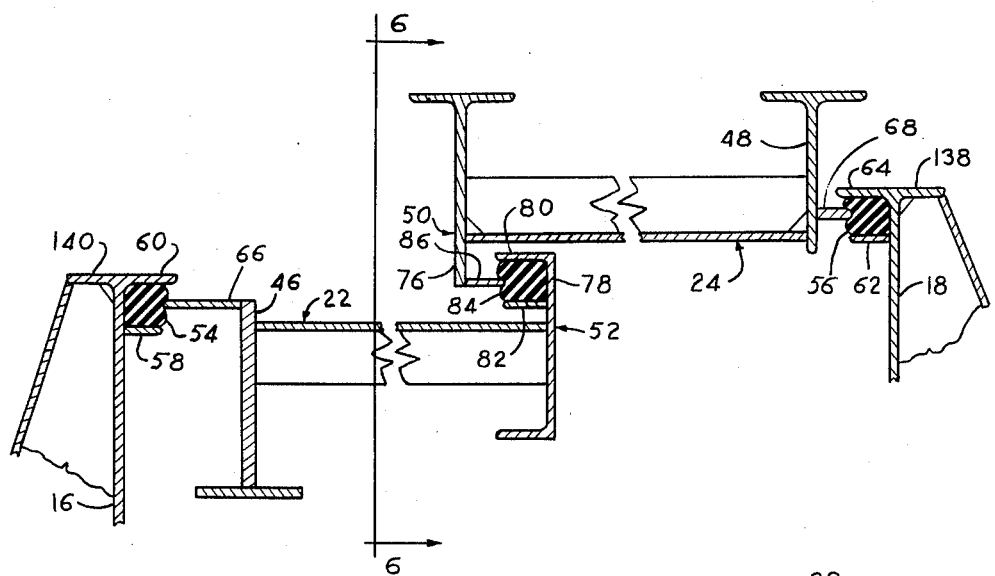
Fig. 3 is a vertical cross-sectional view taken substantially on line 3—3 of Fig. 1.
Figure 6:
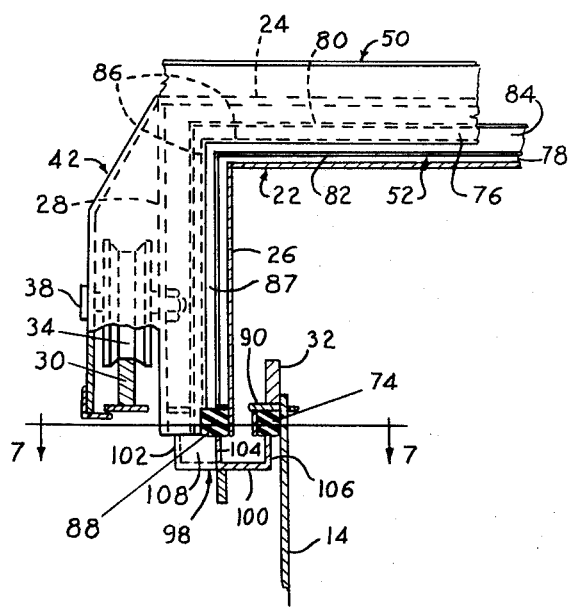
Fig. 6 is a broken vertical cross-sectional view taken on line 6—6 of Fig. 3.
Figure 5:
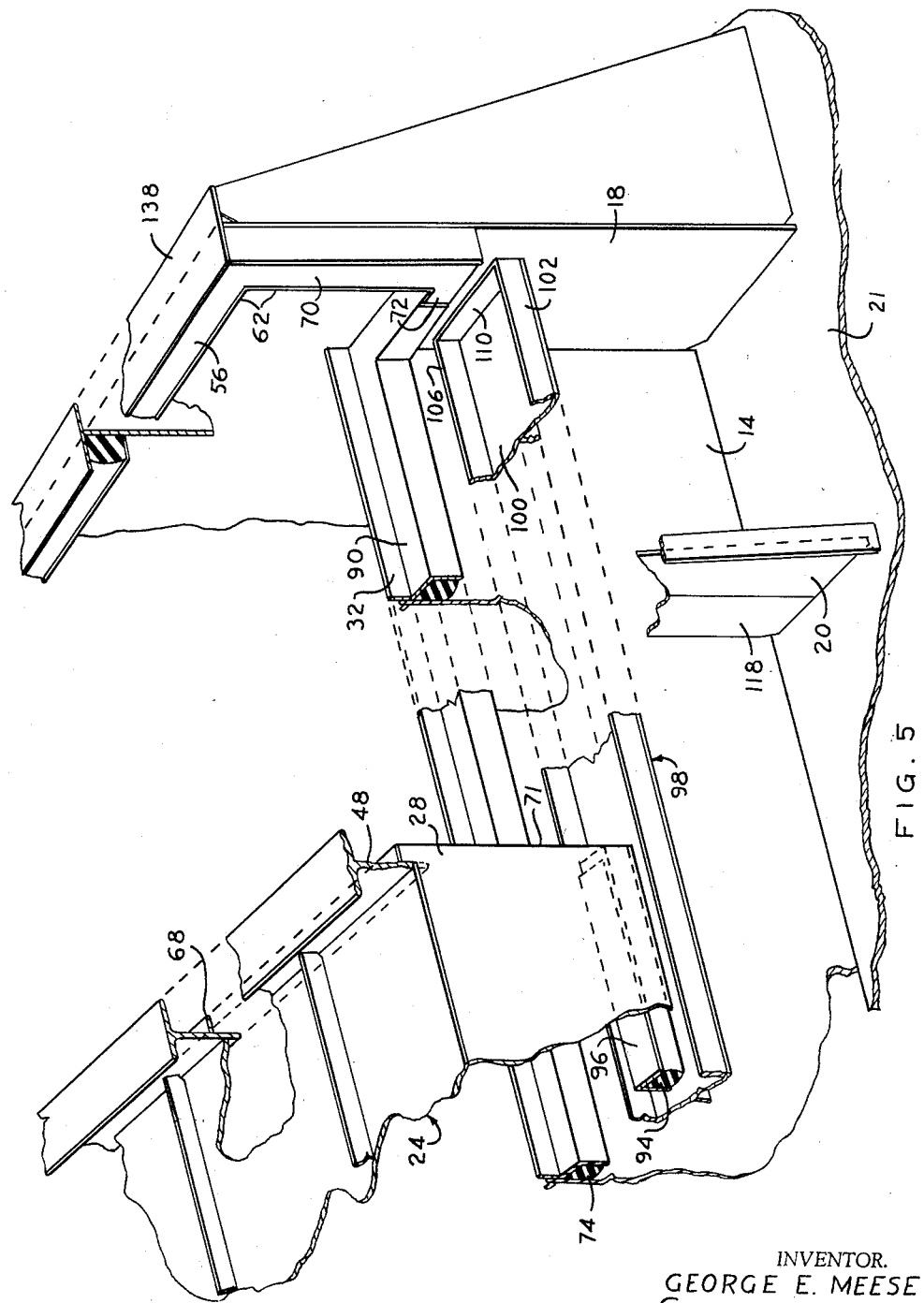
Fig. 5 is a partly broken perspective view of an end of the hatch.

The joint and end wall seals are illustrated in Figs. 3, 5 and 6 where with respect to the end wall seals in Figs. 3 and 6 it will be observed that each of the coaming end walls 16, 18 is provided respectively with a yieldable gasket 54, 56 each supported between vertically spaced horizontal flanges 58, 60 and 62, 64. The ends 46, 48 of the hatch covers are provided with horizontal flanges 66, 68 which sealingly abut the respective gaskets 54, 56 when the hatches are in closed position. As clearly illustrated in Fig. 5, the vertical side edges of the hatch covers are sealed similarly to the horizontal edges. Fig. 5 illustrates the side edge seal for the upper hatch 24 and a description of this suffices for an identical side edge seal of the lower hatch 22. In Fig. 5 the horizontal gasket 56 is provided with a vertical side extension 70 which is engaged by the forward edge 71 of the hatch cover side 28. For purposes that will become more fully apparent hereinafter the extension 70 of gasket 56 has integrally connected to the lower end thereof a horizontal section 72 which extends inwardly along the exposed rear face of coaming end wall 18 until it joins with the end of a horizontal gasket 74 which extends along the outer side of the coaming side wall 14.

The ends 50, 52 of the hatches which are adjacent to each other to form a joint when the hatches are closed are sealed along their horizontal and vertical edges as illustrated in Figs. 3 and 6. As best shown in Fig. 3, the end 50 of the upper hatch 24 is provided with a downwardly extending flange 76 which overlaps upwardly extending flange 78 on the end 52 of the lower hatch 22. The upwardly extending flange 78 carries a pair of vertically spaced horizontal flanges 80, 82 which contain between them a gasket 84. The downwardly extending flange 76 of hatch 24 carries a horizontal flange 86 which sealingly abuts the gasket 84 when the hatch covers are closed. The vertical side edges of the hatches are sealed by vertical side extension 87 of the gasket 84 and a like vertical extension of the flange 86 as shown in Fig. 6. The lower end of the vertical extension 87 of the gasket joins a horizontal gasket 88 which extends fore and aft along the lower outside edge of the side wall 26 of the hatch 22.

Figure 7:
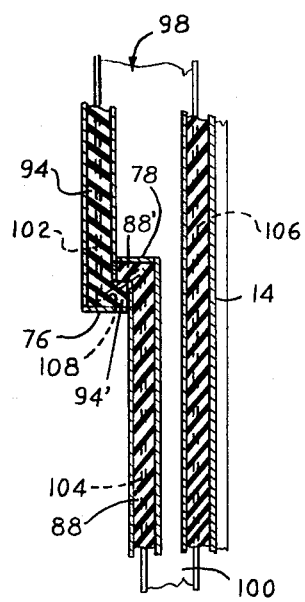
Fig. 7 is a horizontal cross-sectional view taken on line 7—7 of Fig. 6.

In accordance with the invention means are provided for positively sealing the fore and aft side edges of the hatches. Referring to Figs. 2 and 5, the aforementioned gasket 74 is secured adjacent the top of each of the coaming side walls 12, 14. The gasket is clampingly supported in place by a right-angled channel member 90 so that the under side of the gasket is exposed. The aforementioned gasket 88 is secured adjacent the outer bottom edge of the side wall 26 of the lower hatch 22 by a right-angled channel 92 and in similar fashion a gasket 94 is supported by a channel member 96 adjacent the lower inner edge of the side wall 28 of the upper hatch 24 as previously explained. All of the gaskets 74, 88, 94 are supported so that their under sides are exposed in substantially co-planar relationship with the gaskets fixed to the hatch covers being supported on portions of the covers which project laterally outwardly and overhang the coaming side wall 14 so that the cover gaskets are out board of the coaming gaskets. The means provided by the invention for effecting a weather and water-tight seal with the described gaskets comprises a movable member broadly designated by the numeral 98. This member has a flat bottom portion 100 and upstanding side walls 102, 104, 106. The member 98 has a fore-and-aft length substantially equal to the length of the coaming side walls with the wall 102 of the member 98 extending approximately along half the length of the coaming wall and terminating at the point of juncture of the two hatch covers when in closed position. The end of the wall 102 is joined to the adjacent end of the wall 104 by a short diagonal wall portion 108 as shown in Fig. 7, with the wall 104 extending from the point of juncture to the opposite end of member 98. The opposite ends of the walls 102, 104 are joined to the inner wall 106 by short transverse walls one of which is shown and designated by the numeral 110 in Fig. 5.

From the foregoing description it will be apparent that the member 98 is a unitary pan-like structure bounded on all sides by upstanding wall members. Each of the wall members is located so as to be at all times in registry with a gasket; that is to say, the side wall 106 registers with the gasket 74 fixed to the coaming side walls, the end wall 110 registers with inturned gasket portion 72 (Fig. 5) with the corresponding opposite end wall (not shown) doing likewise, and the side walls 102, 104 respectively registering with the gaskets 94, 88 affixed to the lower edges of the hatch covers 22, 24 as previously described. Where the hatch covers form a joint at the mid-point of the coaming, the gaskets 94, 88 extend respectively inwardly and outwardly at 94' and 88' as shown in Fig. 7 and sealingly overlap along their adjacent vertical faces with the aforementioned diagonal wall portion 108 being adapted to extend across the overlapping portions of the gaskets as shown in Fig. 7.

Figure 4:
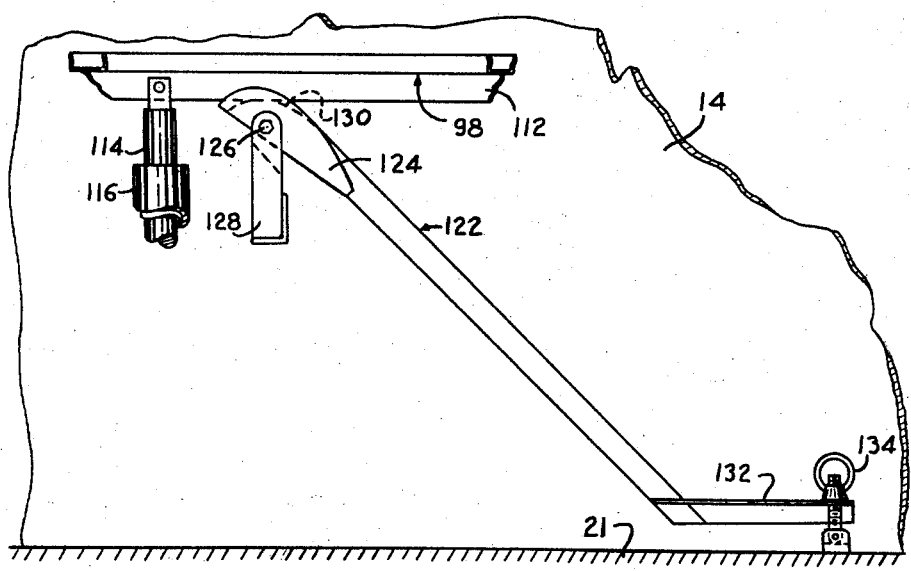
Fig. 4 is a broken partial side elevational view of a feature of the present invention.

The sealing member 98 is intended to be moved between a sealing position where the wall members sealingly engage the gaskets in registry therewith and a non-sealing position where the member 98 is lowered out of engagement with the gaskets. Raising and lowering of the member 98 may be accomplished in a variety of ways, a preferred means being illustrated in Figs. 1, 2 and 4 where it will be noted that the member 98 is provided with a centrally disposed downwardly extending fin 112 extending the length of member 98. Attached to the fin at spaced intervals along its length are the upper bifurcated ends of plungers 114 which are slidingly received in suitable guide pipes 116 welded or otherwise attached to the transverse webs 118 joining the brackets 20 with the coaming side walls. The upper end of the web is suitably slotted or recessed as shown at 120 to accommodate the member 98 as it is reciprocated between sealing and non-sealing positions. As shown in Fig. 4, the member 98 is actuated by a lever 122 having a slotted head portion fixedly pivoted at 126 to a suitable bracket member 128 welded or otherwise secured to the coaming side wall. The slotted head 124 receives the fin 112 and is provided with a cam surface 130 which exerts an upward force on the member 98 when the lever 122 is pivoted clockwise in Fig. 4. The opposite end of the lever may be provided with a handle portion 132 which may if desired be stepped upon by an operator to rotate the lever and move the member 98 upwardly. A pivoted clamping member 134 fixed to the deck of the barge or other surface 21 may be brought into engagement with the end of the handle portion 132 and screwed downwardly to insure that the member 98 is raised into tight sealing engagement with the gaskets on the hatch covers and the coaming. As illustrated in Fig. 1, several levers are preferably provided to insure that a uniformly tight seal is provided along the length of the hatch covers.

When the hatch covers are closed any of a variety of means may be utilized to retain their ends in tight sealing relationship with the ends of the hatch coaming. The means illustrated in Fig. 1 comprise a plurality of hooks 136 which engage outwardly extending flanges 138, 140 (Fig. 3) on top of the respective coaming end walls 18, 16. The hooks may be tightened in any preferred manner known in the art as for example by turn-buckles or they may be of the quick release variety utilizing well-known toggle linkages.

In operation, with the member 98 out of engagement with the side gaskets and the hooks 136 released, the hatch covers may be rolled to any desired position. When it is desired to close the hatch covers they are moved fore and aft until their end flanges 66, 68 shown in Fig. 3 abut the gaskets 54, 56. The hooks 136 are engaged over the coaming flanges 138, 140 and are tightened to insure a sealing relation between the flanges 66, 68 and their respective gaskets. When the hooks are tightened, the flange 86 of hatch 24 is likewise sealingly clamped against gasket 84 to form a water-tight joint between the hatches, it being contemplated that there will be sufficient yield in the end and center gaskets to compensate for any dimensional discrepancies so that a tight seal is formed at the joint between the hatches as well as at their ends. After the hooks have been tightened, the operator then moves the side levers 122 clockwise by pressing down with his foot on the handles 132 so as to raise member 98 into sealing engagement with the respective side gaskets. After the member 98 has been raised sufficiently the clamp 134 is engaged with the ends of the handle 132 and screwed downwardly a sufficient amount to insure a positive water-tight seal along the length of the hatch over side edges.

An advantageous feature of the present invention resides in the ability of the member 98 to serve as a hatch cover brake when the covers are partially opened. To effect this at any desired position of the covers, the member 98 may be raised into frictional engagement with the gaskets for releasably retaining the hatch covers in the selected position.

The present invention has been shown and described in connection with a hatch provided with two over-and-under sliding hatches. It will be apparent to those skilled in the art that the invention can be utilized with equal effectiveness with any number or type of hatch covers from one to several, it being only necessary to provide the member 98 with a sufficient number of side walls corresponding to the number and arrangement of the hatch covers. It should also be noted that the present invention is by no means limited strictly to use with marine hatchways since it is quite obvious that the invention can be used in a variety of locations, as for example, in sealing tank and storage bin covers and the like. It will be further noted that the present invention is susceptible of a variety of modifications and changes without however departing from the scope and spirit of the appended claims.

What is claimed is:

1. In combination with a fixed vertical wall and a movable cover member resting on said wall said cover member having an overhanging portion projecting exteriorly of said wall and extending the length thereof, means for effecting a seal between said wall and said cover member comprising a sealing gasket fixed to said wall and extending longitudinally from end to end thereof, a second sealing gasket fixed to the overhanging portion of said cover member in spaced substantially parallel relationship with said first gasket, an imperforate movable member of a size for simultaneously engaging both of said gaskets in sealing relationship throughout their length, and means for moving said member into and out of engagement with said gaskets.

2. The combination of claim 1 wherein said gaskets are co-planar and one of them has at each of its ends a transverse portion sealingly engageable with the corresponding end of the other gasket when said cover is in closed position.

3. In combination with a hatchway coaming and a hatch cover, said coaming having end walls and side walls surrounding said hatchway, means for effecting a water-tight seal between said cover and said coaming side walls comprising horizontal gaskets fixed to said side walls and extending from end wall to end wall and having exposed bottom sealing faces, said cover having overhanging portions co-extensive with the length of said coaming side walls and projecting laterally outwardly over said coaming side walls, horizontal gaskets fixed to the overhanging portions of said cover and having exposed bottom sealing faces and co-extensive with the gaskets on said coaming side walls, imperforate sealing members co-extensive in length with said gaskets on said cover and said coaming and having a width sufficient to simultaneously engage in sealing relationship the exposed faces of the gaskets on said coaming and on said cover, and means for moving said imperforate member vertically beneath said overhanging portions of said cover into or out of sealing engagement with the exposed faces of said gaskets.

4. The combination of claim 3 wherein said sealing members comprise metallic pan-like structures having imperforate bottoms and upstanding integrally connected side walls and end walls, said walls being sealingly engaged with said gaskets when said members are moved theretowards.

5. The combination of claim 4 wherein said gaskets are provided at their ends with laterally projecting portions having exposed bottom sealing faces extending between the ends of said gaskets, said end walls of said pan-like sealing member engaging said laterally projecting portions when said side walls sealingly engage the gaskets.

6. In combination with a hatchway coaming and a hatch cover, said coaming having end walls and side walls surrounding said hatchway, means for effecting a water-tight seal between said cover and said coaming side walls comprising horizontal gaskets fixed to said side walls and extending from end wall to end wall and having exposed sealing faces, said cover having overhanging portions co-extensive with the length of said coaming side walls and projecting laterally outwardly over said coaming side walls, horizontal gaskets fixed to the overhanging portions of said cover and co-extensive with the gaskets on said coaming side walls, imperforate sealing members co-extensive in length with said gaskets on said cover and said coaming and having a width sufficient to simultaneously engage in sealing relationship the exposed faces of the gaskets on said coaming and on said cover, and means for moving said imperforate member into or out of sealing engagement with the exposed faces of said gaskets.

7. In combination with a hatchway coaming and a hatch cover, said coaming having end walls and side walls surrounding said hatchway, means for effecting a water-tight seal between said cover and said coaming side walls, comprising sealing means fixed to said side walls and extending from end wall to end wall, said cover having overhanging portions co-extensive with the length of said coaming side walls and projecting laterally outwardly over said coaming side walls, second sealing means fixed to the overhanging portions of said cover and co-extensive with the sealing means on said coaming side walls, imperforate sealing members co-extensive in length with said first and second sealing means on said cover and said coaming and having a width sufficient to engage simultaneously in sealing relationship the sealing means on said coaming and on said cover, and means for moving said imperforate member into or out of sealing engagement with said sealing means.

8. In combination with a hatchway coaming and a hatch cover, said coaming having end walls and side walls surrounding said hatchway, means for effecting a water-tight seal between said cover and said coaming side walls, horizontal sealing means fixed to said side walls and extending from end wall to end wall and having a co-extensive downwardly exposed sealing part, said cover having overhanging portions co-extensive with the length of said coaming side walls and projecting laterally outwardly over said coaming side walls, second horizontal sealing means fixed to the overhanging portion of said cover and having a downwardly exposed sealing part co-extensive with the part of said first sealing means, imperforate sealing members co-extensive in length with the exposed parts of said first and second sealing means and having a width sufficient to engage simultaneously in sealing relationship the exposed parts of said sealing means on said coaming and on said cover, means for movably supporting said imperforate member in registering relationship with said exposed parts of said sealing means, and actuating means for moving said imperforate member into or out of sealing engagement with the exposed parts of said sealing means.

References Cited in the file of this patent

FOREIGN PATENTS 977,480     France _____ Nov. 15, 1950